(12) United States Patent
Zaiser

(10) Patent No.: US 7,306,334 B2
(45) Date of Patent: Dec. 11, 2007

(54) METHOD FOR POSITIONING A SEMI-FINISHED SPECTACLE LENS

(75) Inventor: Michael Zaiser, Boebingen (DE)

(73) Assignee: Carl Zeiss Vision GmbH, Aalne (DE)

( * ) Notice: Subject to any disclaimer, the term of this patent is extended or adjusted under 35 U.S.C. 154(b) by 0 days.

(21) Appl. No.: 11/386,130

(22) Filed: Mar. 22, 2006

(65) Prior Publication Data

US 2006/0221300 A1 Oct. 5, 2006

Related U.S. Application Data

(60) Division of application No. 11/177,457, filed on Jul. 8, 2005, now Pat. No. 7,150,528, which is a continuation of application No. PCT/EP2004/000012, filed on Jan. 3, 2004.

(30) Foreign Application Priority Data

Jan. 11, 2003 (DE) ................ 103 00 777

(51) Int. Cl.
*G02C 7/02* (2006.01)
*G02C 13/00* (2006.01)

(52) U.S. Cl. ................ 351/178; 351/177; 351/246; 700/159

(58) Field of Classification Search ............... 351/178
See application file for complete search history.

(56) References Cited

U.S. PATENT DOCUMENTS

| 3,737,238 | A | * | 6/1973 | Reiner et al. ............ 356/401 |
| 3,962,833 | A | * | 6/1976 | Johnson .................... 451/42 |
| 4,176,501 | A | * | 12/1979 | Bardonnet et al. ......... 451/460 |
| 5,498,200 | A | * | 3/1996 | Werner .................... 451/460 |
| 6,012,965 | A | | 1/2000 | Savoie ...................... 451/6 |
| 6,056,633 | A | * | 5/2000 | Sesena et al. ............. 451/384 |
| 6,743,486 | B1 | | 6/2004 | Miyazawa ................ 427/596 |
| 6,813,536 | B1 | | 11/2004 | Gottschald ............... 700/160 |
| 6,913,356 | B2 | | 7/2005 | Belly et al. ............... 351/177 |
| 2002/0146161 | A1 | | 10/2002 | Suzuki et al. ............. 382/141 |

FOREIGN PATENT DOCUMENTS

| CA | 2491096 | 1/2004 |
| DE | 3829488 | 3/1990 |
| EP | 0865 871 A2 | 9/1998 |
| WO | WO 2004/015482 A2 | 2/2004 |

\* cited by examiner

*Primary Examiner*—Jessica T Stultz
(74) *Attorney, Agent, or Firm*—GrayRobinson, PA

(57) ABSTRACT

In a method for the parallax-free centering of an optical element, in particular a semifinished product of a future spectacle lens, on a holder of a centering or mounting device, the optical element is provided with engravings. The centering of the optical element is performed with the aid of the engravings.

7 Claims, 3 Drawing Sheets

METHOD FOR POSITIONING A
SEMI-FINISHED SPECTACLE LENS

CROSS REFERENCE TO RELATED
APPLICATIONS

This is a divisional of U.S. patent application Ser. No. 11/177,457 filed on Jul. 8, 2005, now U.S. Pat. No. 7,150,528, which itself is a continuation of international application number PCT/EP2004/000012 filed Jan. 3, 2004 which designated the U.S. and claimed priority to German application number DE 103 00 777.6 filed Jan. 11, 2003.

BACKGROUND OF THE INVENTION

The invention relates to a method for the parallax-free centering of an optical element, in particular a semifinished product of a future spectacle lens, on a holder of a centering or mounting device, the optical element being provided with engravings.

DESCRIPTION OF THE RELATED ART

It is already known from the general prior art that semi-finished products of non-individual progressive lenses are produced in a casting process. During the casting process, engravings are also introduced into the front side of the semifinished product. The engravings permit an orientation of the semifinished product which is required because of the free form surface of the future progressive lens. After the casting process and possibly surface treatments, the semi-finished products are provided with a stamped image and aligned at a mounting device or a blocking device. During the blocking process, the semifinished product is connected to a mount or a blocking piece via blocking material so that, in the following processing steps, the semifinished product can be mounted in processing machines for processing the back surface.

In the case of individual progressive lenses, the semifin-ished product is produced from a blank in a turning or milling process and a subsequent polishing process. Here, the engravings are applied via a separate process, for example laser processing, engraving or similar methods, to the finished front surface.

DE 38 29 488 C2 discloses an apparatus and a method for centering spectacle lenses, a spectacle bank being aligned on a mount. The image of the blank acquired by a video camera or an image scanner is displayed on a computer screen and the contour of the finished lens, which is input in the computer, is superimposed on it. A top carriage has on its top side a system of coordinates and three identification points seen in the x-direction of the top carriage. The blank has the same identification points. The identification points of the blank and of the mount of the top carriage must cover one another exactly so that the spectacle lens is exactly centered. The method for centering and blocking a spectacle lens is carried out here with the aid of a stamped image on the spectacle lens. Also, this process does not serve for centering semifinished products.

SUMMARY OF THE INVENTION

Consequently, it is an object of the invention to provide a method that permits a simplification of the process steps and simplifies the centering and alignment at a centering and mounting device.

This object is achieved according to the invention by virtue of the fact that the centering of the optical element is performed with the aid of the engravings.

A simple and accurate aligning or centering at the mounting device can be performed with the aid of the engravings provided with the semifinished product/spectacle lens. The process step of "stamping" the semifinished product is therefore eliminated.

Advantageous refinements and developments of the invention emerge from the further subclaims and the exemplary embodiment described below in principle with the aid of the drawings.

DETAILED DESCRIPTION

Figure 1:
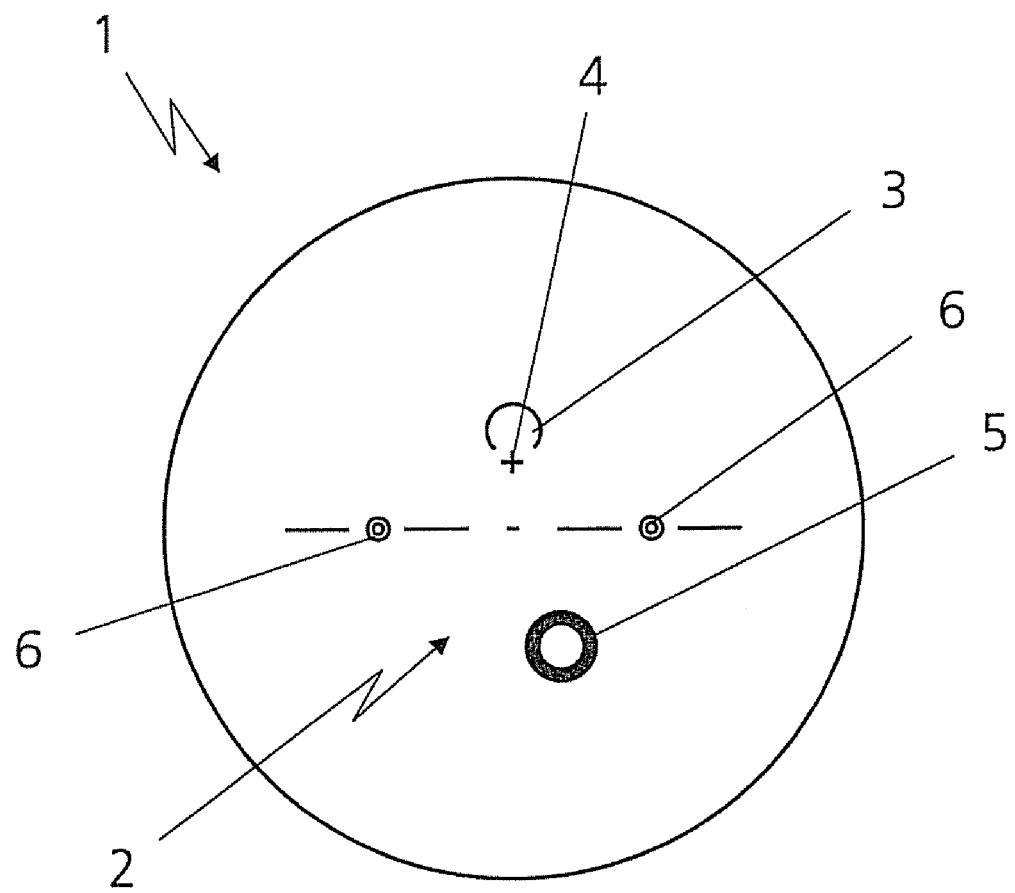
FIG. 1 shows an illustration of the principle of a spectacle lens/semifinished product according to the prior art.

FIG. 1 shows as prior art a semi-finished product 1 that is provided with a stamped image 2. The stamped image 2 is also that stamped image which an ophthalmic optician requires for monitoring the distance power and the near power. According to the prior art, this stamped image 2 consists of a distance measuring circle 3, the ophthalmic optician being able to use a centering cross 4 for the subsequent monitoring of the distance power. Using the known concave-side measuring method, the ophthalmic optician can subsequently measure the required near measured value in a near measuring circle 5. After removal of the stamped image 2, the ophthalmic optician can reconstruct all the reference and measured points with the aid of a pair of mutually-spaced, generally punctiform, lens engravings 6, so-called permanent engravings, and a measuring template. The permanent engravings 6 also identify the spectacle lens type, a spectacle lens identification such as, for example, T66 for the refractive index 1.665 being engraved in each case below an engraving point. The addition is to be found in general under the second engraving point 6, and is likewise engraved. Depending on the manufacturing company, different data are to be found under the nasal and under the nasal and temporal engraving points.

The present inventive method does not require the stamped image 2: this is not the edge processing of spectacle lenses already provided on both sides with optical surfaces such as occur for further processing at the ophthalmic optician's premises.

Figure 2:
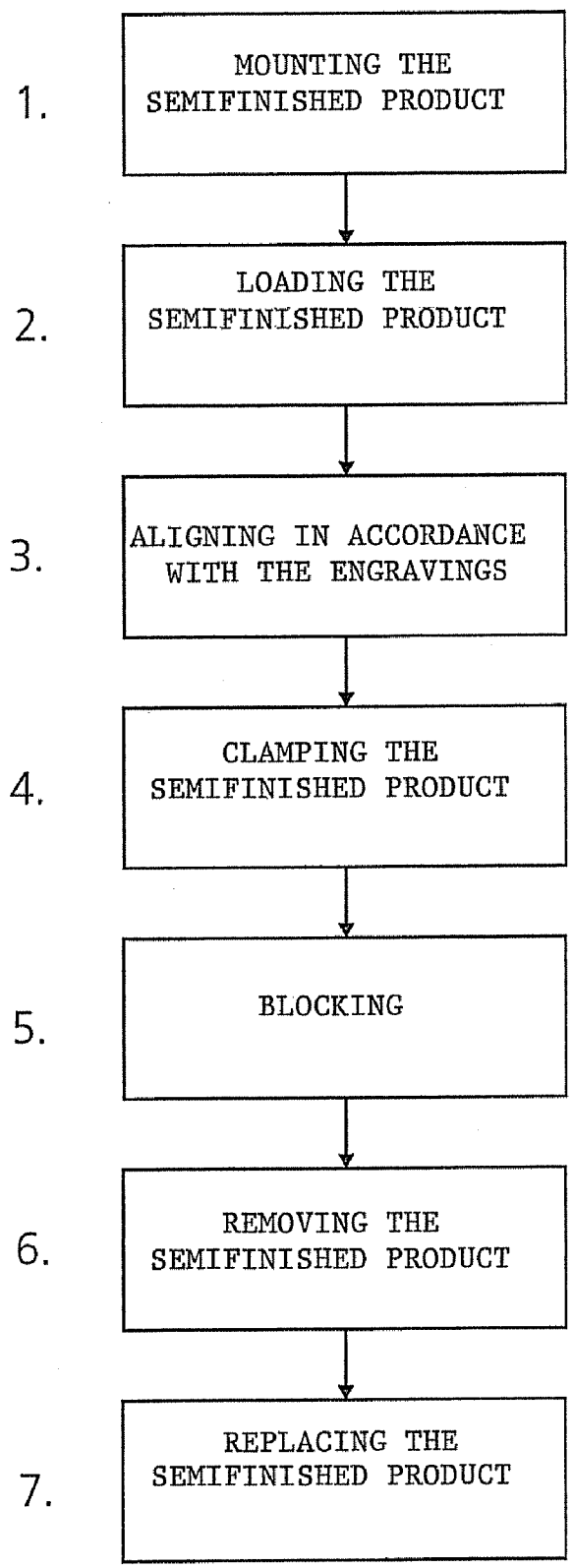
FIG. 2 shows an illustration of the principle of a method according to the invention with the aid of a block diagram.
Figure 3:
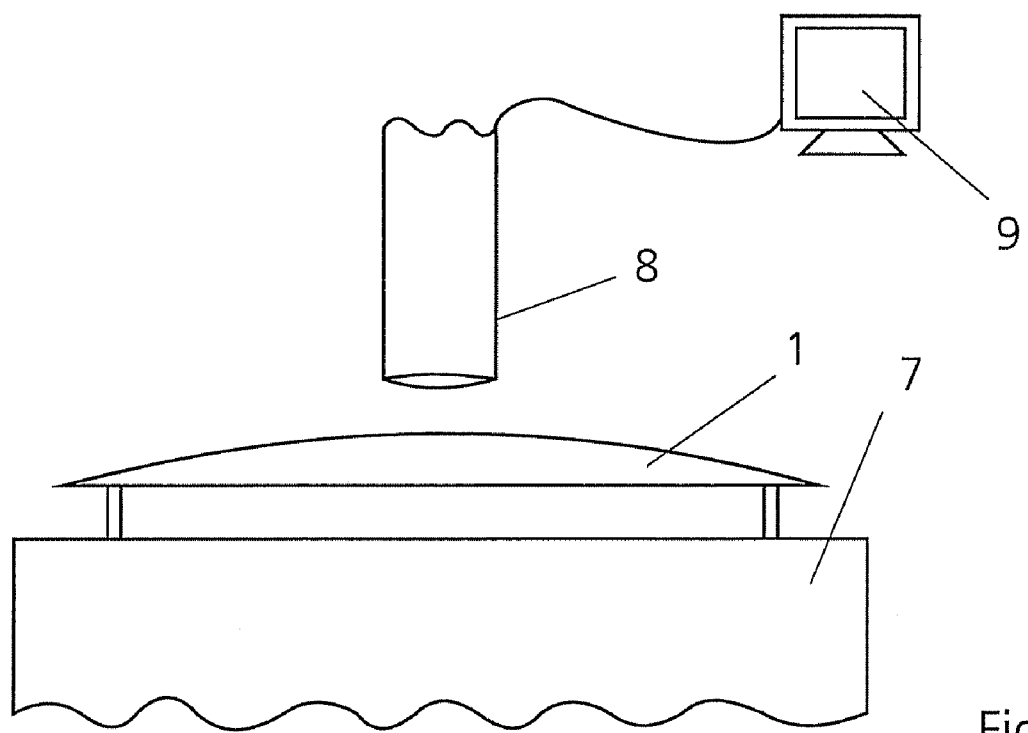
FIG. 3 shows a centering and mounting device with the semifinished product.

The method according to the invention is outlined briefly in FIG. 2 in the manner of a block diagram. The first step is for the semifinished product 1 to be picked up by hand from a transport container, it being possible for a number of semifinished products to be stored in the transport container. In this case, the semifinished product 1 is already varnished or provided with a protective film which is required, in particular, for plastic lenses in order to prevent damage. In the second step, the semifinished product 1 is laid onto a centering and mounting device 7 that is not illustrated in more detail here in FIG. 3. The semifinished product 1 is now aligned with the aid of the engravings 6. This requires the use of an appropriate image processing technique that visualizes the engravings 6 for the operator. Use may be made for this purpose of an appropriately highly resolving camera 8 that records the position of the semifinished product 1 on the centering and mounting device 7. Furthermore, it is possible to use a lighting technique in conjunction with the high resolution camera 8. Whether a lighting technique is required depends on the ambient conditions. The lighting conditions at the production site play a large role here, as does the image processing. If camera systems that are insensitive to ambient lighting are to hand, it would also be possible to require no lighting techniques. Lamps, conventional emitters or else conventional light sources can be used for the lighting technique. This can be necessary in order to produce a certain contrast for the corresponding camera system, the aim being that the depressions of the engravings 6 produce a shadow image.

The output signal generated via the camera 8 can be evaluated with the aid of appropriate software and displayed to the operator on a screen 9. The desired position of the engravings 6 can also be prescribed on the screen 9. Once the semifinished product 1 has been placed on the centering and mounting device 7, the desired position of the engravings 6 can be read in or faded in on the screen 9 with the aid of input commands. The operator turns or positions the semifinished product 1 until the engravings 6 of the semifinished product 1 come to lie within the desired position. The blocking process can then be initiated, the semifinished product 1 generally firstly being clamped via a clamping mechanism before the actual blocking process can begin.

The start of the blocking process can also be linked with the desired position via intelligent evaluation software such that the blocking process cannot be started until the semifinished product 1 is located in the correct lens position, that is to say within the permissible desired position.

The current lens position can be illustrated in x/y coordinates on the screen 9 as a deviation from the desired position. This favors simple operation by means of a WINDOWS interface. The correct lens position can be signaled by signaling elements.

Once the blocking process has been initiated, the semifinished product 1 can now be taken from the centering and mounting device 7 and laid back into the transport container.

Of course, it is also possible to let the process steps one to seven run automatically, which means that the handling of the semifinished product 1, and the decision on correct block position, could be taken over by a handling system or a control unit, for example by a robot.

It would also be possible in principle, in addition to the possibility already mentioned above, to make use for the alignment at the centering and mounting device 7 of a first mount that is required for processing the front surface. Since the semifinished product 1 already has a defined position on the first mount, this position can now be retained until a second mount can be fixed accurately in position onto the semifinished product 1. A detailed description is disclosed in DE 102 29 150.0, which is a prior publication.

It is thereby possible to align the semifinished product 1 on the centering and mounting device with the aid of the engravings 6, which are always introduced into the semifinished product 1, especially in the case of progressive lenses. The process step of "stamping" can thereby be eliminated, and the method therefore results in higher productivity and economical operation.

I claim:

1. A method for positioning an optical element on a mounting device, said method comprising the steps of:
   a.) providing an imaging camera in imaging relation to the optical element when the optical element is supported on the mounting device;
   b.) providing an output signal from said imaging camera, said output signal representing an image of a pair of mutually spaced, generally punctiform, engravings present on the optical element at respective locations lying interiorly of a peripheral edge portion of the optical element;
   c.) evaluating said output signal to determine a positional relationship between a current position of the optical element with respect to the mounting device and a desired position of the optical element with respect to the mounting device based on information derived from said output signal without reliance upon information relating to any reference for the optical element other than said pair of mutually spaced, generally punctiform, engravings, and
   d.) positioning the optical element with respect to the mounting device based on said positional relationship as determined as a result of said evaluating step.

2. A method as claimed in claim 1, wherein said optical element comprises a semi-finished product of a future spectacle lens.

3. The method as claimed in claim 2, further comprising the step of visually displaying said desired position of the engravings on a monitor.

4. The method as claimed in claim 2, further comprising the step of initiating a blocking process conditioned upon said current position and said desired position being sufficiently aligned with one another.

5. A method for positioning a semi-finished product of a future spectacle lens on a mounting device, said method comprising the steps of:
   a.) locating an imaging camera in imaging relation to the semi-finished product of a future spectacle lens when the semi-finished product of a future spectacle lens is supported on the mounting device;
   b.) providing an output signal from said imaging camera, said output signal representing an image of a pair of mutually spaced, generally punctiform, engravings formed into the semi-finished product of a future spectacle lens at respective locations lying interiorly of a peripheral edge portion of the semi-finished product of a future spectacle lens;
   c.) evaluating said output signal to determine the positional relationship between a current position of the semi-finished product of a future spectacle lens with respect to the mounting device and a desired position of the semi-finished product of a future spectacle lens with respect to the mounting device based on information derived from said output signal, and
   d.) positioning the semi-finished product of a future spectacle lens with respect to the mounting device based on said positional relationship determined as a result of said evaluating step.

6. The method as claimed in claim 5, further comprising the step of visually displaying said desired position of the engravings on a monitor.

7. The method as claimed in claim 5, further comprising the step of initiating a blocking process conditioned upon said current position and said desired position being sufficiently aligned with one another.

* * * * *

UNITED STATES PATENT AND TRADEMARK OFFICE
CERTIFICATE OF CORRECTION

PATENT NO. : 7,306,334 B2
APPLICATION NO. : 11/386130
DATED : December 11, 2007
INVENTOR(S) : Michael Zaiser It is certified that error appears in the above-identified patent and that said Letters Patent is hereby corrected as shown below:

On the front page:
   delete "Aalne" and replace with --Aalen--

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,306,334 B2  Page 1 of 1
APPLICATION NO. : 11/386130
DATED : December 11, 2007
INVENTOR(S) : Michael Zaiser It is certified that error appears in the above-identified patent and that said Letters Patent is hereby corrected as shown below:

On the front page, Item (73) Assignee City:
 delete "Aalne" and replace with --Aalen--

This certificate supersedes the Certificate of Correction issued September 23, 2008.

Signed and Sealed this

Fourteenth Day of October, 2008

JON W. DUDAS
*Director of the United States Patent and Trademark Office*